May 21, 1963  A. E. NASHMAN ET AL  3,090,240
ELECTRONIC ACCELEROMETER
Filed Oct. 27, 1960                                 5 Sheets-Sheet 1
*Fig. 1*  *Fig. 2*  *Fig. 4*
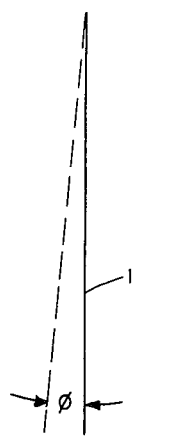
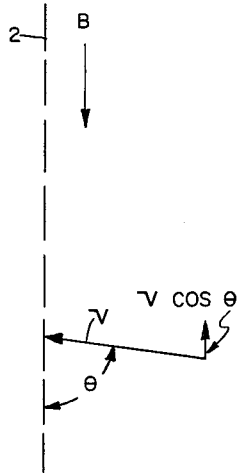
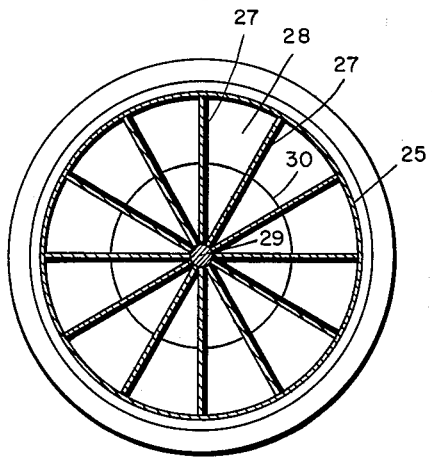
*Fig. 5*
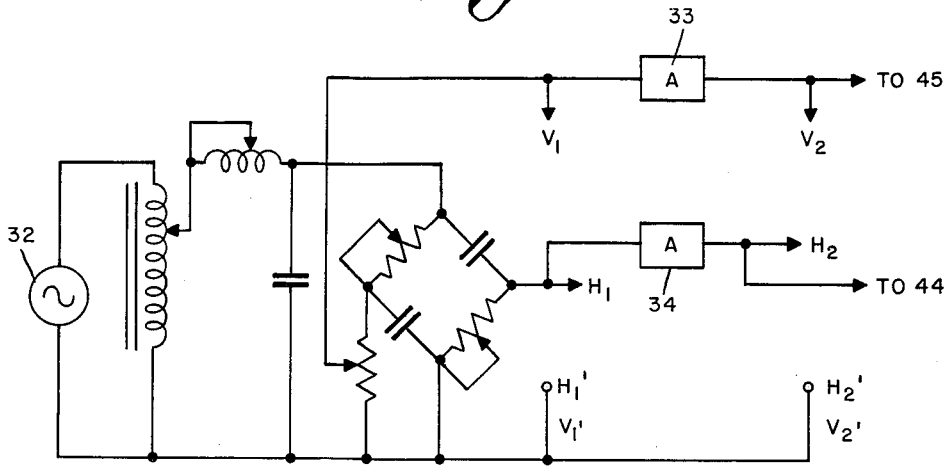
INVENTORS.
ALVIN E. NASHMAN
DONALD METSKY
BY Isidore Togut
ATTORNEY

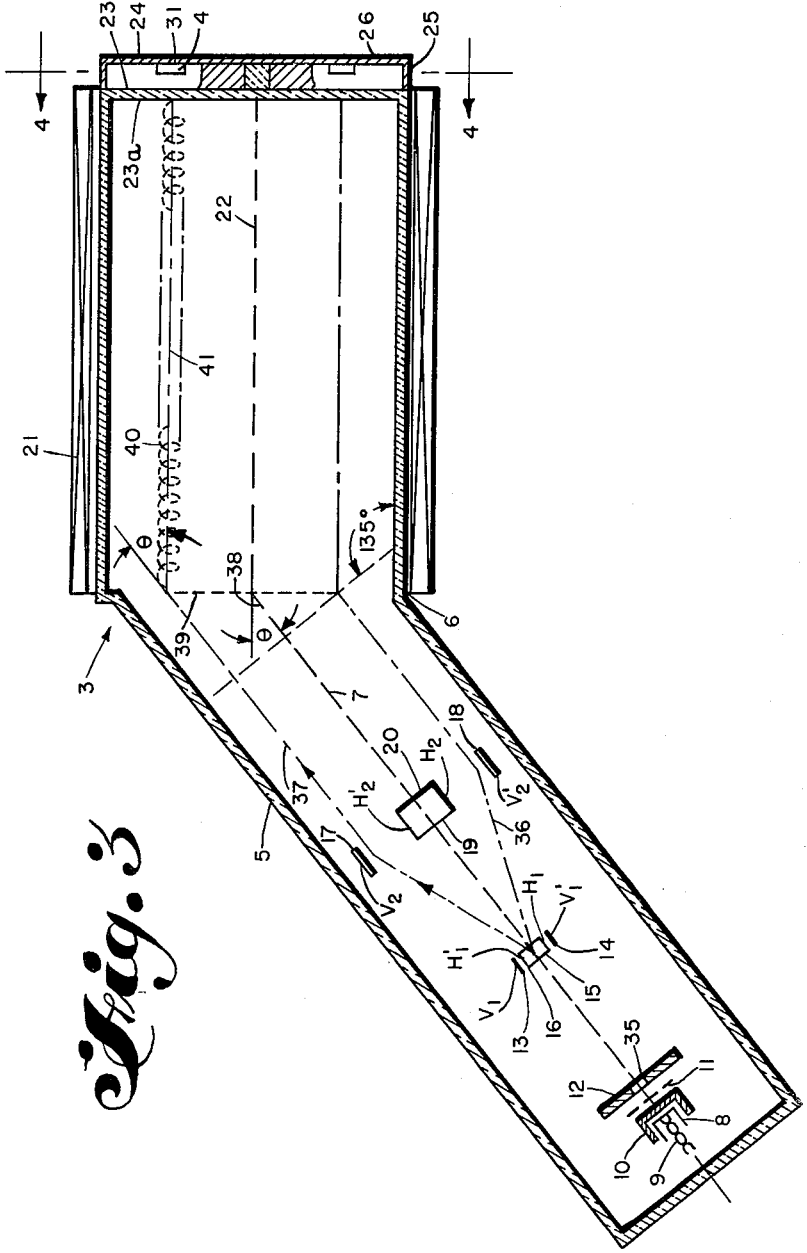

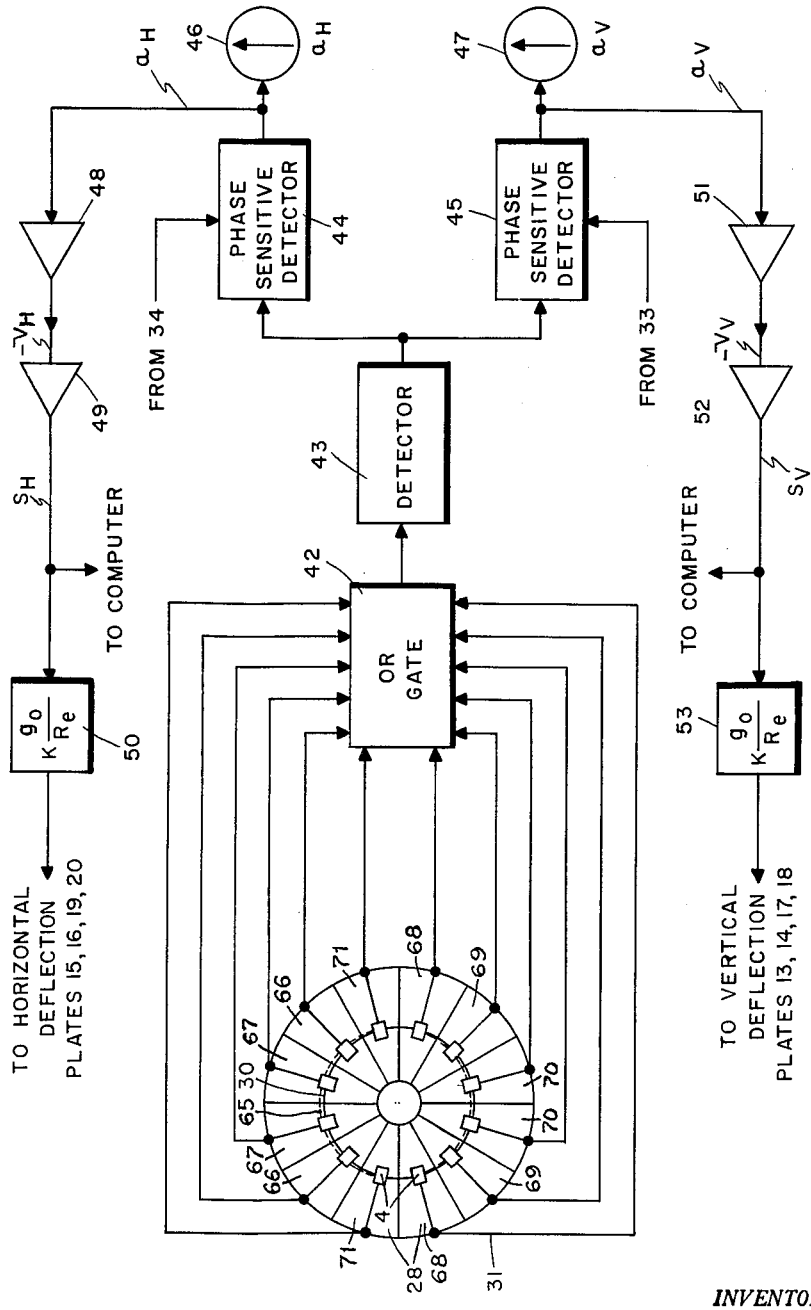

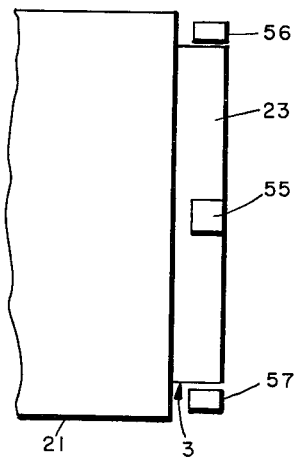
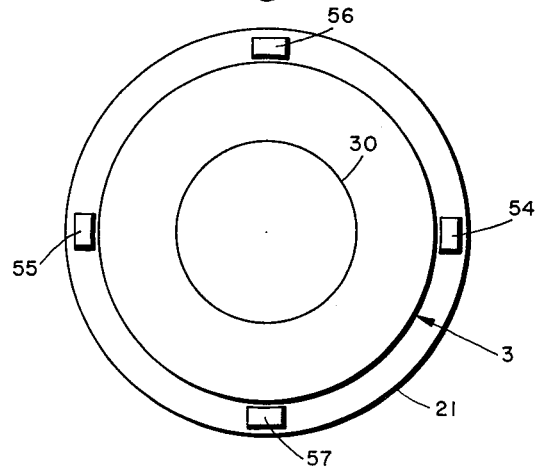
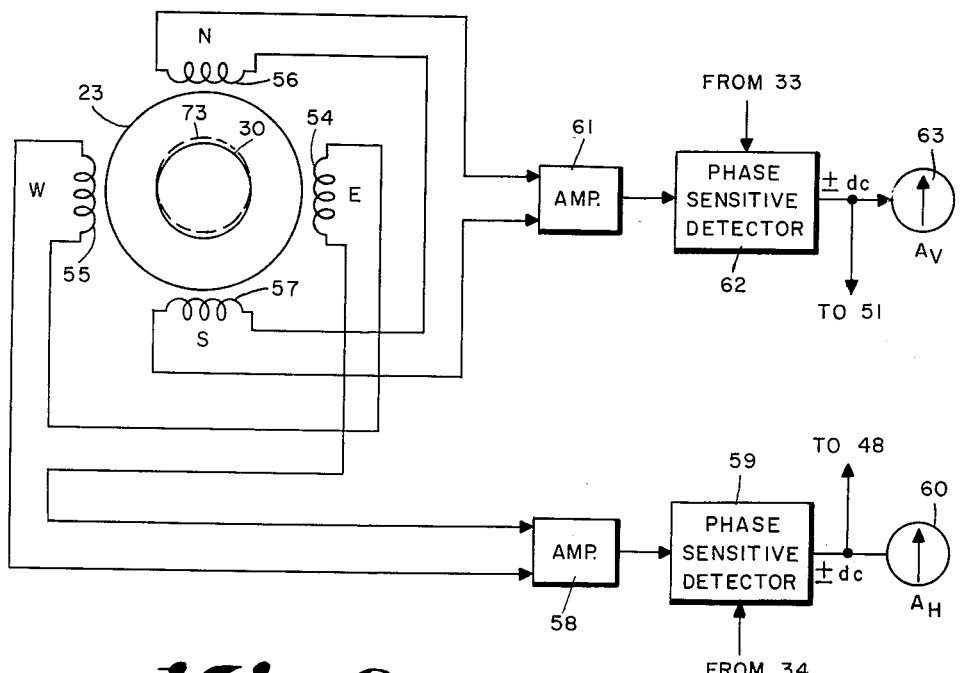
INVENTORS.
ALVIN E. NASHMAN
DONALD METSKY
BY
ATTORNEY

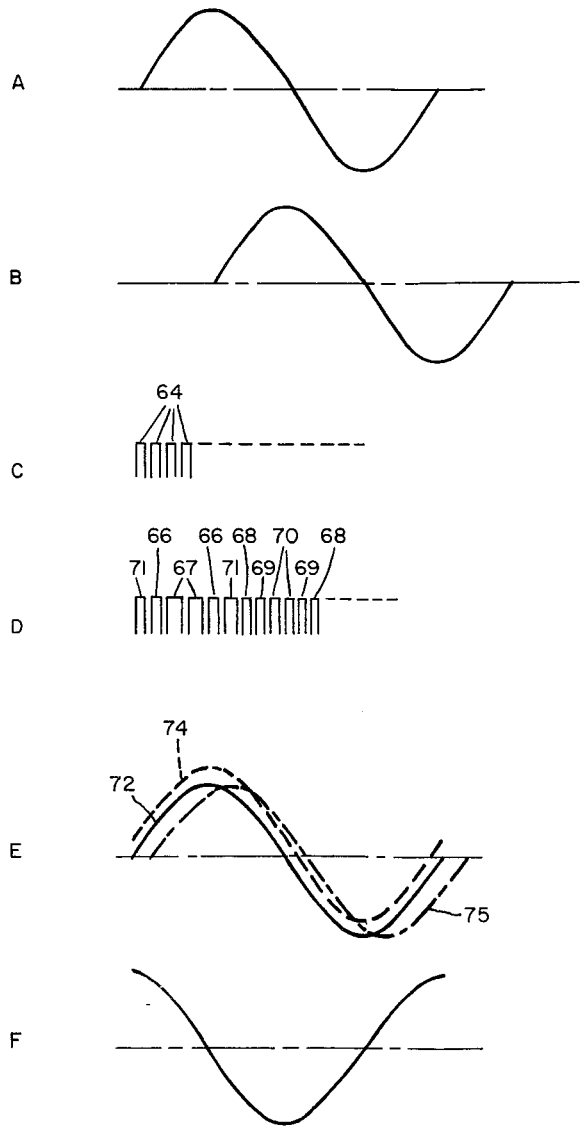

United States Patent Office 3,090,240
Patented May 21, 1963

3,090,240
ELECTRONIC ACCELEROMETER
Alvin E. Nashman, Rutherford, and Donald Metsky, Livingston, N.J., assignors to International Telephone and Telegraph Corporation, Nutley, N.J., a corporation of Maryland
Filed Oct. 27, 1960, Ser. No. 65,392
10 Claims. (Cl. 73—517)

This invention refers to accelerometers and more particularly to accelerometers wherein the acceleration responsive means are electrically charged particles.

In the operation of high speed aircraft, guided missiles, or pilotless aircraft and the like, it is desirable to provide means which indicate the forces acting on the craft to control the flight of the aircraft to the desired objective. Such means must be reliable and extremely accurate and as free as possible of any errors caused by the nature of the acceleration sensing means which are inherent in accelerometers using mechanical acceleration responsive structure. These mechanical acceleration responsive means are subjet to hysteresis and various other effects that cause inaccurate indications.

It is an object of this invention to provide an accelerometer free from inaccuracy inherent in accelerometers having mechanical acceleration responsive means.

It is another object to provide an accelerometer which is sensitive to accelerations of extremely small and minute magnitudes.

A feature of this invention is an accelerometer to be used with a moving vehicle which includes a cathode ray tube comprising within this tube means for producing a beam of electrically charged particles, a display screen and means to produce a trace on the display screen. There is provided means to delay the time required for the particle to traverse the spacing between the beam producing means and the display screen and means to indicate any movement of the trace on the display screen which is indicative of the magnitude and direction of the movement of the vehicle in response to an accelerating force.

Another feature of this invention is a provision within the cathode ray tube for directing the beam of electrically charged particles to generate a cone of revolution and further means for directing the beam to generate a cylinder of revolution following the cone of revolution and means causing each particle of the beam to travel in a helical path about an axis on the periphery of the cylinder of revolution, the helical axis being parallel with the axis of the tube thereby producing a circular trace on the display screen.

These and other features and objects of this invention will become more apparent by reference to the following description taken in conjunction with the accompanying drawings, in which:

FIG. 1 and FIG. 2 are geometrical figures useful in describing the theory of this invention;

FIG. 3 is a side elevation view in cross-section of the cathode ray tube of this invention;

FIG. 4 is a view taken along view 4—4 of FIG. 3;

FIG. 5 is a schematic of the circuit required for producing the necessary deflections of the beam of the cathode ray tube of FIG. 3;

FIG. 6 is a block diagram of one embodiment of the acceleration sensing and detecting system of this invention;

FIG. 7 is a partial view of the cathode ray tube of this invention showing alternative acceleration sensing means;

FIG. 8 is a side elevation view of FIG. 7;

FIG. 9 is a block diagram of a second embodiment of the acceleration sensing system of this invention; and FIG. 10 is a group of waveforms useful in describing the operation of this invention.

Referring now to FIGURES 1 and 2, there is shown an axis 1 of a cathode ray tube (not shown) which is in line with the local vertical. A charged particle (electron, positive ions, etc.) traveling along the axis 1 will not be deflected. If, however, the electron beam is not in line with the local vertical, the deflection is proportional to sine $\phi$. Maximum deflection will occur when the particle beam is normal to the local vertical. If the cathode ray tube is mounted on a moving vehicle, the charged particle beam will be subjected to a deflection due to the component of acceleration from the local vertical and from the vehicle acceleration. By applying the Schuler pendulum principle to null out the deflections due to the local vertical, the beam deflection will be dependent solely upon the vehicle acceleration.

Such a device could be used as an electronic acceleration transducer. However, this type of device could not accomplish the expected results with existing components because deflections due to the normal range of accelerations in conventional cathode ray tubes are extremely minute. Consider a cathode ray tube with an electron beam ⅓ meter long from the accelerating anode to the screen. It can be shown that if the beam is subjected to an acceleration of 1 g, and the velocity of the electron beam is one-tenth the speed of light (with anode voltage of 2500 volts), the beam will be deflected $5 \times 10^{-16}$ meters. Since a spot diameter of .001 inch ($2.5 \times 10^{-5}$ meters) is considered very good with present phosphors, the deflection will be much less than the minimum spot size. It may be noted that in a scheme of this type, deflections of interest would occur over a large range, say from .001 g's to 10 g's or more. When the acceleration is .001 g's, the actual deflection of interest would be as little as $5 \times 10^{-19}$ meters. A conventional type of cathods ray tube capable of experiencing a deflection of one spot size diameter at an acceleration of .001 g's would have to be over 2,000,000 meters long. By the use of positive ions instead of electrons (reducing $e/m$ ratio by 1/1840), the length can be shortened by $e/m$ to approximately 50,000 meters to experience the same beam deflection with an aceceleration of .001 g's. A corresponding decrease in the $e/m$ ratio (using heavier particles) would result in a shorter tube to experience the same beam deflection. However, the tube size is still much too long for any practical system.

This invention provides for simulation of a very long cathode ray tube to provide deflections of sufficient magnitude to supply the useful information. The tube length necessary to experience given deflection can be reduced by the use of heavier charged particles as noted above. The cathode ray tube of this invention for application as an accelerometer consists briefly of a gun for accelerating the charged particles, a long solenoid for providing an axial constant magnetic field and a fluorescent screen. The charged particles in the beam would acquire a given velocity as the result of voltages applied to the gun before entering the constant magnetic field. This field will cause the charged particles to be deflected in a path dependent upon the velocity of the particles, the angle of entry into the field and the strength of the magnetic field.

A charged particle entering a constant magnetic field will have a force exerted on it equal to $evB \sin \theta$ newtons, where $e$ is the charge (coulombs), $v$ is the velocity (meters per second), B is the field (meters per square meter) and $\theta$ is the angle between the vectors representing the velocity and the field. When the two vectors are at right angles, the charged particle will travel in a circular path. At angles less than 90°, particle travels in a helix; a circular motion dependent upon the normal velocity component and the motion along the magnetic field dependent upon the magnitude of the velocity components in that direction. The velocity of the particles along the axis of the tube is $v \cos \theta$. In this invention, the charged particles from the gun enter the magnetic field B and travel down the axis of the tube in a helix until the particles strike the fluorescent screen. An improvement in deflection should result whose order of magnitude is inversely proportional to the square of sine $\theta$. Thus if the electron gun is placed such that the angle $\theta$ is 89.94° sine $\theta$ is .001 and an increase in beam deflection of 1,000,000 results. Controlling this angle to 89.99943 degrees (sin $\theta$=.0001) would produce an increase of beam deflection of 100 million times. Thus, an expression of beam deflection is developed in terms of $\theta$. For an accelerometer capable of sensing deviations of .001 $g$ with a tube one meter long and an angle $\theta$ of 89.99943 degrees, beam deflection is equal to 250 divided by the $e/m$ ratio. Under these conditions an electron beam will deflect $1.42 \times 10^{-9}$ meters and a beam of positive ions will deflect $2.6 \times 10^{-6}$ meters. Since minimum screen spot size diameter is $2.5 \times 10^{-5}$ meters, tubes using heavier particle beams are required for a device capable of sensing deviations less than .001 $g$. When the angle $\theta$ is 89.94 degrees the same deflection results when the device is subjected to accelerations of .1 $g$. Heavier particles are required to improve the sensitivity of the device.

Referring now to FIG. 3, there is shown a cathode ray tube, 3, having an elongated envelope one portion 5 of which is disposed at an angle to a second portion 6. Within the envelope portion 5 spaced along the central axis 7 thereof are mounted by suitable means an electron gun comprising a cathode 8, heater 9, cathode shield 10, control grid 11, and apertured accelerating and beam forming electrode 12. Spaced apart from the accelerating electrode 12 and disposed about the axis 7 is a first pair 13 and 14 of vertical deflection plates and a first pair 15 and 16 of horizontal deflection plates disposed about the axis 7, deflection plate 16 being directly in back of deflection plate 15. Disposed some distance along the axis 7 from the first pair of horizontal deflection plates 15 and 16 and the first vertical deflection plates 13 and 14 is a second pair of vertical deflection plates 17 and 18 and a second pair of horizontal deflection plates 19 and 20, the horizontal deflection plate 20 being directly in back of the horizontal deflection plate 19. Disposed outside of the envelope portion 6 of the cathode ray tube 3 and surrounding the periphery thereof is an electromagnetic coil or solenoid 21 which provides a magnetic field of appropriate strength extending along the central axis 22 of the envelope portion 6 of the cathode ray tube 3. At the end of the envelope portion 6 is a fluorescent screen 23a on the inside surface of a face plate 23. Outside the envelope portion 6 and covering the entire face plate 23 thereof there is disposed a cylindrical member 24. Referring particularly to FIGURE 4, there is shown the internal construction of the cylindrical member 24 with relation to the face plate 23. The cylindrical member 24 comprises a cylinder 25 one end of which abuts face plate 23 and the other end is closed by the disc 26. Radial elements 27 connect the disc 26 with the face plate 23 and divide the face plate 23 into 12 equal segments or sectors of a circle, each sector being denoted by the number 28. Each sector, therefore, is enclosed by walls 27 on both sides and that portion of the cylindrical wall 25 enclosed between the two respective walls 27 and a portion of a central member 29 at the center of the cylindrical member 24. This construction provides that each sector 28 is shielded from every other sector 28 and from outside light sources and the only light visible in a particular sector is from that portion of the face plate 23 enclosed by the boundary walls of the particular sector. The circle 30 denotes the trace of the beam of electrically charged particles on the screen, the nature of which will be more particularly described later on. Within each sector 28, and mounted on the disc 26 is disposed a photoelectric cell or device 4 preferably placed so that the center of the device 4 lines up with the periphery of the circular trace 30. From each photoelectric cell 4 emanates a lead 31 for connection to the appropriate circuitry as will be described later on.

FIGURE 5 shows the schematic diagram for the production of the circular trace utilized in the operation of this invention. Although this circuit is not part of this invention its operation will be briefly described. The reference voltage from a generator 32 is impressed upon both pairs of deflection plates, the horizontal deflection plate and the vertical deflection plates such that both component voltages have a phase difference of 90°. In this circuit, the deflection voltages in both pairs of plates are mutually displaced by ±45° by means of an RC network as shown. The first output from the phase differentiating circuit $V_1$ and $H_1$ is impressed upon the first pair of vertical deflection plates 13 and 14 and the first pair of horizontal deflection plates 15 and 16. The same output is then fed to amplifiers 33 and 34 and the output of the amplifier 33 and 34 $V_2$ and $H_2$ are fed to the second pair of vertical deflection plates 17 and 18 and the second pair of horizontal deflection plates 19 and 20. The beam of electrically charged particles emerges from the anode accelerating plate 12 through the aperture 35 in a straight line along the axis 7 of the envelope portion 5 of the cathode ray tube 3. When the beam passes through the first pair of horizontal deflection plates 15 and 16 and the first pair of vertical deflection plates 13 and 14, the electron beam is deflected into a conical path 36. That is, the beam sometimes termed a "rotating pencil beam" describes a cone of revolution 36 whose axis is the axis 7. When the beam in its cone of revolution enters the space defined by the second pair of horizontal deflection plates 19 and 20 and vertical deflection plates 17 and 18, the beam then becomes a cylinder-directrix beam with a cylindrical envelope 37. This second pair or set of deflection electrodes will have to deflect the charged particles in the conical envelopes 36 in such a manner that they will be returned to the original angle with respect to the axis 7. That is, the cylinder of revolution 37 described by the second time deflected beam revolves about the axis 7. Each particle in the beam now enters the magnetic field generated by the solenoid 21, and is acted upon by the magnetic field to travel in a helical path, the axis of the path being parallel to the axis 22 of the envelope portion 6 of the cathode ray tube 3. If there were no deflection system, all the particles in the electron beam would enter the magnetic field at the same point, that is at the junction 38 of axes 7 and 22, and the axial field could exist in a right circular cylinder. With the particles in the circular path, however, the arrival time in the magnetic field would vary with each position in the circular trace as defined by the broken line 39. As each charged particle of the beam enters the magnetic field, it will describe the path of a helix (greatly exaggerated for purposes of illustration) as shown by the broken line 40, the axis of this helix being the axis 41. As the cylinder-directrix beam of the cylindrical envelope 37 rotates about the axis 7, each charged particle in the beam as it enters the magnetic field will be forced into its own helical path, the axis of the path lying on the periphery of the cylindrical envelope 37, the diameter of which is equivalent to the broken line 39. This helix will rotate about each axis lying on the periphery of the generated cylinder of revolution in the portion 6 until it strikes the fluorescent screen 22a and produces a luminous spot thereon. The combined result then of the luminous spots produced by particles traveling in its helical path on the periphery of the cylinder of revolution is the circular trace 30. An optimum axial field would be a truncated cylinder with a truncated angle $\theta$ slightly less than 90° with the axis 22. The pitch of the helix being equal to $v_{oy}T$ where $v_{oy}$ is the velocity of the charged particle along the helix axis and T is the period or time for one revolution would be at a minimum when $\theta$ is slightly less than 90° and therefore the maximum delay and longest path can be attained with such values of $\theta$. The charged particles striking the face of the screen 22a will not have a fixed delay with respect to the time they passed the second group of deflection plates. This is because the distance from the plane of the deflection system to the axial field will vary within the circular path. Since the delay is known and is constant for each circular position, compensation will have to be provided to nullify this effect. However, system parameters can be selected to neglect this effect. In the case where the frequency of the generator 32 is 1,000 c.p.s. and there are twelve equal sectors such as the sector 28 on the face plate 23 of the cathode ray tube 3, the time it will take for the trace 30 to cover one sector is $$\frac{1}{1000 \times 12}$$

or 83.5 microseconds. If the particle is traveling at $\frac{1}{10}$ the speed of light and the largest particle path is 10 cm. longer than those particles traveling the shortest path, the longest delay is $$\frac{.1}{3 \times 10^7} = .0033 \text{ microseconds}$$

Much lower particle velocities could be used before this delay must be considered.

This invention can be used in all electronic acceleration transducer systems in which a Schuler loop eliminates the component due to gravity. Such a system is shown in FIG. 6. This is accomplished by orienting the two sets of deflection plates in the north-south, and east-west planes respectively with the axis 22 of the cathode ray tube 3 in coincidence with the local vertical. In FIGURE 6 there is shown the 12 equal sectors 28 of the cathode ray tube face plate 23 with the circular trace 30 and a photocell 4 disposed within each sector with the midpoint of the photocell 4 approximately coincident with the circular trace 30. The output of each photocell 4 is coupled by lead 31 to an OR gate 42. The output of the OR gate 42 which are pulses of equal width of the trace 30 centered about the axis of the tube is coupled to a pulse width detector 43, such as described in chapter 9 of volume 3 of the Radiation Laboratory Series published by McGraw Hill Book Company, Inc., 1947, and the output of detector 43 is fed into phase sensitive detectors 44 and 45. Also fed into phase sensitive detector 44 is the output of amplifier 34 and into the phase sensitive detector 45 is fed the output of amplifier 33 which is 90° out of phase with the output of amplifier 34. The output of phase sensitive detector 44 is fed into an indicating device such as device 46 which may be a meter and the output of phase sensitive detector 45 is fed into a similar indicating device 47. The indicating device 46 will indicate the acceleration in the horizontal or east-west direction and the indicating device 47 will indicate acceleration in the vertical or north-south direction. The output of phase sensitive detector 44 which is a voltage proportional to the acceleration in the horizontal direction is also introduced into a first Schuler loop, the output of which loop is fed back to the two groups of horizontal deflection plates 15 and 16 and 19 and 20. The Schuler loop for correction in the horizontal plane comprises a first integrator 48 to which is coupled the output of phase sensitive detector 44. The output of integrator 48 is a voltage proportional to the velocity of the vehicle in the horizontal direction. This voltage is fed into a second integrator 49 and the output of this integrator 49 is the voltage proportional to the distance traveled in the horizontal plane by virtue of the original acceleration in that plane. The output of integrator 49 is fed into a correction factor amplifier 50. In amplifier 50 the voltage output of integrator 49 is operated upon by a voltage proportional to the component of acceleration due to the local verical muliplied by an appropriate constant K and divided by the radius of the earth $R_e$. The resultant output of amplifier 50 is then fed into the two sets of horizontal deflection plates 15, 16 and 19, 20 to provide the appropriate correction in the loop by eliminating the component due to gravity. In the same manner in the vertical or north-south plane, the output of the phase sensitive detector 45 is coupled to a third integrator 51, the output of which is a voltage proportional to the velocity in the vertical plane, this voltage is fed into integrator 52 the output of which is the voltage proportional to the distance traveled in the vertical plane. The output of integrator 52 is coupled to amplifier 53 to provide the appropriate correction due to gravity in the vertical plane and the output of amplifier 50 is coupled to the vertical deflection plates 13, 14 and 17, 18.

The voltage obtainable from each sector 28 of the fluorescent screen of the cathode ray tube 3 is proportional to the light falling on the photocell scanning that particular sector. As long as the circle 30 has its origin in the center of the tube, the voltage output from each photocell sector would be equal. If the beam were deflected due to an acceleration component, the circular trace 30 would no longer have its origin in the center. The resultant output of the photocell section from the detector 43 yields an amplitude modulated signal in which an error signal, $E_E$ exists.

$E_E = K(e_H \sin \omega t + e_V \cos \omega t)$ where $e_H$ is the error in the horizontal plane and $e_V$ is the error in the vertical plane. These signals are compared with the two reference signals $E_H = V_H \sin \omega t$ which is the output of amplifier 34 that is fed into the phase sensitive detector 44 and $E_V = V_V \cos \omega t$ which is the output of amplifier 33 that is fed into the phase sensitive detector 45. The output of the two phase sensitive detectors 44 and 45 will be D.C. voltages which are proportional to the acceleration components in each plane. These D.C. voltages contain the acceleration components due to vehicle motion and to gravity. These output voltages also contain other acceleration components such as those due to Coriolis and centripetal effects. The Schuler loop as described above nulls out the acceleration components in the particular axis.

An alternative embodiment of the acceleration sensing system of this invention is shown in FIGURES 7, 8, and 9. In this alternative embodiment two pairs of electromagnetic pickoffs, such as are used in commercially available devices as the E pickoff or synchro control transformer, are used to obtain an error signal. One pair is disposed in the horizontal or east-west plane and comprises pickoffs 54 and 55. The other pair is disposed in the vertical or north-west plane and is composed of pickoffs 56 and 57. As shown in FIGURE 9, the horizontal pickoffs 54 and 55 are connected to a differential amplifier 58. The output of the differential amplifier 58 is coupled to a phase sensitive detector 59 and the phase sensitive detector output is coupled to a meter 60 or any other indicating device to indicate the acceleration in the horizontal plane. Similarly, pickoffs 56 and 57 for the vertical plane are coupled to a differential amplifier 61 the output of which is fed into a phase sensitive detector 62 and the output of the phase sensitive detector is introduced into a meter 63 to indicate the acceleration in the vertical plane. With no beam deflection, the circular trace 30 has its origin in the center of the cathode ray tube 3 and the outputs of the phase sensitive detectors 59 and 62 are zero. When a deflection occurs, the output of each amplifier 58 and 61 will contain an error signal.

$$E_E = K(e_H \sin \omega t + e_V \cos \omega t)$$

This error signal is compared with the two reference signals from amplifiers 33 and 34 in the phase sensitive detectors 59 and 62 to obtain output D.C. voltages proportional to the acceleration components in each plane. If there is no deflection of the beam and consequently no deviation of the circular trace 30 from its original position with its origin in the center of the cathode ray tube, then the output of the two differential amplifiers will be zero. When any deflection occurs there will be a resultant output from each differential amplifier or one of them depending upon the direction of the acceleration and a consequent D.C. output from the phase sensitive detectors which will indicate on the meters 60 and 63 the accelerations in the horizontal and vertical planes.

The waveforms of FIG. 10 serve to illustrate the operation of the circuitry of this invention. Waveform A is the sine wave output $V_1$ and $V_2$ and waveform B is the sine wave output $H_1$ and $H_2$ 90° out of phase with waveform A. Waveform C shows the pulse 64 output of the OR gate 42 when the circular trace 30 is centered about the axis of the cathode ray tube indicating no accelerations acting on the tube. In this case, the pulses 64 are all of equal width. However, when the circular trace is deflected, for example, upwards because of an accelerating force, the trace assumes the position indicated by the broken line 65 and the pulse output is as shown in waveform D with the pulses corresponding to the position of the trace 65. In waveform E, which shows 3 waves superimposed for ease of illustration and comparison, the sine wave 72 represents the output of differential amplifier 61 to which is coupled the outputs of magnetic pickups 56 and 57 when there is no acceleration. When the luminous spot is at the N position in the trace 30 as shown in FIG. 9, there will be a maximum output from pickup 56 and a minimum output from pickup 57. The output of amplifier 61 will be positive. Conversely, with the spot at the S position, there will be a maximum output from pickup 57 and minimum output from pickup 56 thus providing a maximum negative output from amplifier 61. The outputs from pickups 54 and 55 being equal will be cancelled in amplifier 58 so no output will occur therefrom. Waveform F is the sine wave output of amplifier 58, which is 90° out of phase with the output of amplifier 61, and no acceleration acting on the tube. If the circular trace is displaced towards N because of an accelerating force, as shown by the trace 73, waveshape 74 will result and the acceleration is proportional to the amplitude difference. If the acceleration force is to the right, waveshape 75 results and the phase difference is proportional to the acceleration in that direction. Similar waveshapes can be shown for waveform F.

While we have described above the principles of our invention in connection with specific apparatus, it is to be clearly understood that this description is made by way of illustration and not as a limitation to the scope of our invention as set forth in the objects thereof and in the accompanying claims.

We claim:

1. In an accelerometer for use with a moving vehicle, a cathode ray tube including means within said tube for producing a beam of electrically charged particles, a display screen, means to produce a circular trace on said display screen, means to delay the time required for each said particle to traverse the space between said beam producing means and said display screen along a path parallel to the axis of said tube, by causing each said particle to follow a helical path about said parallel path and means to detect any movement of said circular trace on said display screen caused by a change in the rate of movement of said vehicle indicative of the magnitude and direction of said movement.

2. In an accelerometer for use with a moving vehicle, a cathode ray tube including means within said tube for producing a beam of electrically charged particles, a display screen, means to produce a circular trace on said display screen, means to delay the time required for each said particle to traverse the space between said beam producing means and said display screen along a path parallel to the axis of said tube, means to detect any movement of said circular trace on said display screen caused by a change in the rate of movement of said vehicle indicative of the magnitude and direction of said movement, said detection means comprising a plurality of photocells disposed in angular and radial equality about the display screen of said tube, and means to support said photocells in spaced relation with respect to said display screen whereby each said photocell will be responsive to an equal portion of the periphery of said circular trace and to any movement of said portion of said circular trace.

3. In an accelerometer for use with a moving vehicle, a cathode ray tube including means within said tube for producing a beam of electrically charged particles, a display screen, means to produce a circular trace on said display screen, means to delay the time required for each said particle to traverse the space between said beam producing means and said display screen, and means to detect any movement of said circular trace on said display screen caused by a change in the rate of movement of said vehicle indicative of the magnitude and direction of said movement, said detection means comprising a plurality of photocells disposed in angular and radial equality about the display screen of said tube, and means to support said photocells in spaced relation with respect to said display screen whereby each said photocell will be responsive to an equal portion of the periphery of said circular trace and to any movement of said portion of said circular trace and said means to produce a circular trace comprises means to produce first and second signals, said second signal being 90° out of phase with said first signal and said detection means further comprises an OR gate, means coupling the output of said photocells to said OR gate, a pulse width detector coupled to the output of said OR gate, first and second phase sensitive detector, means coupling said first signal and the output of said pulse width detector to said first phase sensitive detector, means coupling said second signal and the output of said pulse width detector to said second phase sensitive detector whereby the output of said first phase sensitive detector is a voltage indicative of acceleration in a first direction and the output of said second phase sensitive detector is a voltage indicative of acceleration in a second direction.

4. In an accelerometer for use with a moving vehicle, a cathode ray tube including means within said tube for producing a beam of electrically charged particles, a display screen, means to produce a circular trace on said display screen, means to delay the time required for each said particle to traverse the space between said beam producing means and said display screen, and means to detect any movement of said circular trace on said display screen caused by a change in the rate of movement of said vehicle indicative of the magnitude and direction of said movement, said means to produce a circular trace comprising means to produce first and second signals, said second signals being 90° out of phase with said first signals and further comprises first and second magnetic sensing means, means disposing said first and second sensing means about said display screen in opposed relationship along a first axis to sense any movement of said circular trace along said first axis, third and fourth magnetic sensing means, means disposing said third and fourth sensing means about said display screen in opposed relationship along a second axis normal to said first axis to sense any movement of said circular trace along said second axis, means responsive to the comparison of said first signal and the output of said first and second magnetic sensing means to derive a voltage indicative of acceleration along said first axis and means responsive to the comparison of said second signal and the output of said third and fourth magnetic sensing means to derive a voltage indicative of acceleration along said second axis.

5. In an accelerometer for use with a moving vehicle, a cathode ray tube including means within said tube for producing a beam of electrically charged particles, a display screen, means to produce a circular trace on said display screen, means to delay the time required for each said particle to traverse the space between said beam producing means and said display screen, and means to detect any movement of said circular trace on said display screen caused by a change in the rate of movement of said vehicle indicative of the magnitude and direction of said movement, and means to produce a circular trace comprising means to produce first and second signals, said second signal being 90° out of phase with said first signal and further comprises first and second magnetic sensing means, means disposing said first and second sensing means about said display screen in opposed relationship along a first axis to sense any movement of said circular trace along said first axis, third and fourth magnetic sensing means, means disposing said third and fourth sensing means about said display screen in opposed relationship along a second axis normal to said first axis to sense any movement of said circular trace along said second axis, a first differential amplifier, means coupling the output of said first and second sensing means to said first differential amplifier, a first phase sensitive detector, means coupling the output of said first differential amplifier and said first signal to said first phase sensitive detector, a second differential amplifier, means coupling the output of said third and fourth sensing means to said second differential amplifier, a second phase sensitive detector, means coupling the output of said second differential amplifier and said second signal to said second phase sensitive detector whereby the output of said first phase sensitive detector is a voltage indicative of acceleration along said first axis and the output of said second phase sensitive detector is a voltage indicative of acceleration along said second axis.

6. A cathode ray tube indicating system comprising a display screen, means for producing a beam of electrically charged particles, first means for directing said particles along a first path, second means for directing said beam along a second path at the conclusion of said first path, and third means for directing each particle of said beam in a delayed path parallel to the axis of said tube and causing each said particle to follow a helical path about said parallel path to cause a circular trace to be described on the display screen of said cathode ray tube.

7. A cathode ray tube according to claim 6 wherein said first beam path describes a cone of revolution and said second beam path describes a cylinder of revolution in tandem with said cone of revolution about the axis of said cathode ray tube.

8. A cathode ray tube indicating system comprising a display screen, means for producing a beam of electrically charged particles, first means for directing said particles along a first path, second means for directing said beam along a second path at the conclusion of said first path, and third means for directing each particle of said beam in a delayed path to cause a circular trace to be described on the display screen of said cathode ray tube, said third means causing each said particle to travel in a helical path about an axis parallel to the axis of said cathode ray tube.

9. A cathode ray indicating system comprising an evacuated tube having a display screen and first and second sections, said first section being angularly disposed relative said second section, means within said first section for producing a beam of electrically charged particles, first deflection means for directing said particles along a first path describing a cone of revolution about the axis of said first section, second deflection means directing said beam along a second path describing a cylinder of revolution along the axis of said first section at the conclusion of said first path and third deflection means for directing each particle of said beam in said described cylinder of revolution in a helical path about an axis parallel to the axis of said second section to cause a circular trace to be described in said display screen.

10. A cathode ray indicating system comprising an evacuated tube having a display screen and first and second portions, said first portion of said tube being angularly disposed relative to said second portion, means within said first portion for producing a beam of electrically charged particles, first deflection means for directing said particles along a path describing a cone of revolution about the axis of said first portion, second deflection means directing said beam along a path describing a cylinder of revolution along the axis of said first portion in tandem with said cone of revolution, third electromagnetic deflection means disposed about said second portion for directing each particle of said beam in said described cylinder of revolution in a helical path about an axis parallel to the axis of said second portion to cause a circular trace to be described on said display screen, means disposed adjacent said display screen to divide said display screen into a plurality of equal sectors, a plurality of photocells, means disposing each of said photocells within each sector in angular and radial equality about said display screen, and means to support said photocells in spaced relation with respect to said display screen whereby each said photocell will be responsive to an equal portion of the periphery of said circular trace and to any movement of said portion of said circular trace within said sector.

References Cited in the file of this patent
UNITED STATES PATENTS

| | | |
|---|---|---|
| 2,200,745 | Heymann | May 14, 1940 |
| 2,412,965 | Chevigny | Dec. 24, 1946 |
| 2,457,620 | Abraham | Dec. 28, 1948 |
| 2,611,105 | Nadir | Sept. 16, 1952 |
| 2,718,610 | Krawinkel | Sept. 20, 1955 |
| 2,830,285 | Davies | Apr. 8, 1958 |